May 27, 1969 R. C. VOIGE 3,446,915

CATHODE RAY TUBE BEAM BLANKING CIRCUIT

Filed Aug. 5, 1966

INVENTOR
BY RAYMOND C. VOIGE
Mueller, Aichele & Rauner
ATTYS.

United States Patent Office 3,446,915

Patented May 27, 1969

3,446,915

CATHODE RAY TUBE BEAM BLANKING CIRCUIT

Raymond C. Voige, Park Ridge, Ill., assignor to Motorola, Inc. Franklin Park, Ill., a corporation of Illinois Filed Aug. 5, 1966, Ser. No. 570,492
Int. Cl. H04n 3/16
U.S. Cl. 178—7.5 10 Claims

ABSTRACT OF THE DISCLOSURE

Blanking of the cathode ray tube of a television receiver is accomplished during horizontal and vertical retrace intervals by connecting a transistor switch in the conductive path of the video amplifier tube. The transistor is normally conductive so that it has no effect on the operation of the video amplifier; but during either horizontal or vertical retrace, gating pulses are applied to the base of the transistor to drive it to cutoff. This causes a high positive blanking pulse to be obtained from the anode of the video amplifier tube to cut off the cathode ray tube for the retrace interval.

Figures 1, 2:
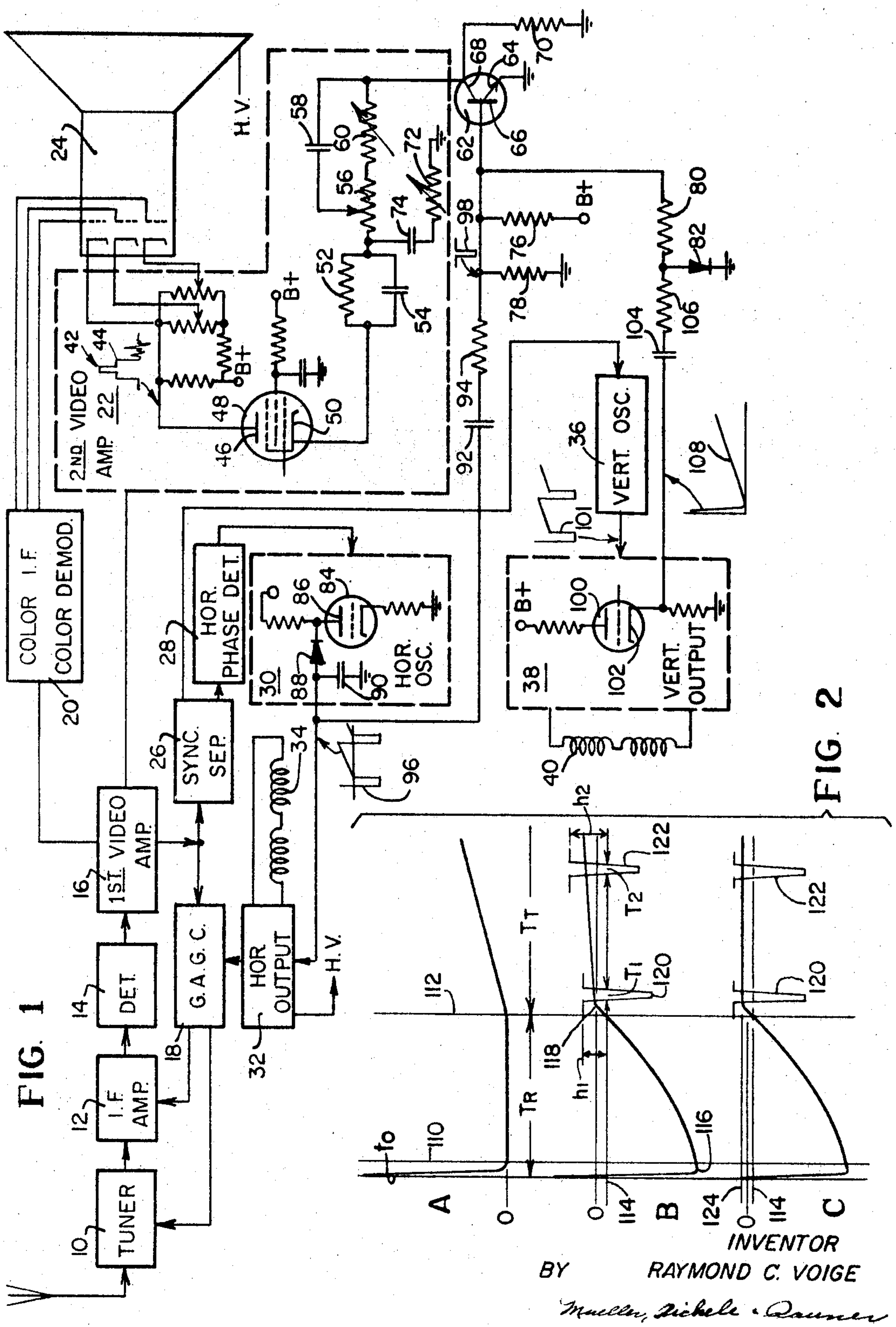

A television receiver commonly employs horizontal and vertical deflection systems to deflect the electron beam across the screen of the cathode ray tube in synchronization with the deflection rate of the televised signal. After each active line sweep the horizontal deflection signal causes the beam to return to the left hand side of the screen in preparation to scan the next line. Similarly after each active field sweep the vertical deflection signal causes the beam to return to the top of the screen. During these return movements or retrace intervals a blanking pluse is transmitted, the amplitude of which is in the blacker than black region of the video signal to extinguish the cathode ray beam. However, these blanking pulses alone may not be sufficient to provide complete beam suppression when, for example, a maximum brightness, minimum contrast condition is present. Incomplete blanking causes the return movements to be visible on the screen so that undesirable bright zones may appear.

To prevent this, a blanking circuit is utilized which is responsive to signals from the deflection system to produce blanking pulses of sufficient magnitude and duration to insure complete suppression of the cathode ray beam during retrace. Blanking has been accomplished by coupling a deflection pulse through a network to the video amplifier which in turn is coupled to the cathode ray tube. However, so as not to load the deflection coil with the video amplifier load and thereby degrade the scanning operation, it is necessary that this network have a relatively high impedance; but this serves to attenuate the blanking pulse applied to the cathode ray tube so that incomplete suppression of the beam during retrace may result.

Another method commonly employed is to couple the high level deflection pulse to the picture tube $G_2$ electrode. The positive voltage of several hundred volts on $G_2$ must be overcome to extinguish the cathode ray beam so that a considerable portion of the pulse is utilized before the picture tube cutoff level is reached. Since the pulse has a finite rise time, there may be a lag between commencement of retrace and the time at which the cathode ray tube is rendered non-conductive.

It is, therefore, an object of this invention to overcome one or more of such problems and to provide an improved beam blanking circuit to effectively suppress the cathode ray beam during retrace.

Another object is to improve the rise time of blanking pulses generated in the television receiver in order to insure picture tube cutoff precisely at the commencement of retrace.

Another object is to provide means to maintain the reference level of the horizontal blanking pulses constant so that the time interval during which the cathode ray tube is cut off is maintained relatively constant.

Another object is to generate blanking pulses which extinguish the electron beam only up to the completion of retrace so that the picture tube is in the proper conductive state at the time trace is to commence.

In the drawings:

FIG. 1 is a diagram partially schematic and partially in block of a television receiver incorporating the invention; and FIG. 2 is a series of waveforms useful in explaining the operation of the invention.

In brief the invention includes a video amplifier in a television receiver which amplifies video signals and applies same to the cathode ray tube. A switching device coupled to the video amplifier is adapted to be switched between different conductive states. A network coupling the deflection system to the switching device is responsive to the deflection signals to provide gating pulses. When the amplitude of a gating pulse is greater than a predetermined level, the switching device is driven into one of the conductive states which causes the video amplifier to develop a blanking pulse. The pulse is coupled to one of the cathode ray tube electrodes and is of such duration and polarity to extinguish the electron beam during a retrace interval.

Referring now to the drawings, FIG. 1 illustrates a television receiver including a tuner 10 which selects signals from an associated antenna to convert a received signal to a fixed frequency for further selection and amplification in IF amplifier 12. Detector 14 demodulates the IF signals applied thereto and produces a composite video signal. The luminance components in the video signal are amplified in video amplifiers 16 and 22 and applied to the multiple cathodes of cathode ray tube 24. The video signal is coupled from first video amplifier 16 to the color IF and color demodulator combination 20 which separates the color information and provides color difference signals to be applied to the multiple grids of cathode ray tube 24. The composite video signal is coupled to gated AGC circuit 18 wherein a DC control potential indicative of the strength of the received television signal is developed. The control potential is applied to amplifying devices in tuner 10 and IF amplifier 12 for the gain regulation thereof. The video signal is also coupled to synchronizing signal separator circuit 26 which develops horizontal and vertical synchronizing components. The horizontal synchronizing components are applied to horizontal phase detector 28 which develops a control voltage for synchronization of the deflection signal developed by horizontal oscillator 30. The horizontal deflection signal is amplified by horizontal output stage 32 and applied to the yoke 34 disposed on the neck of cathode ray tube 24 to develop a sawtooth wave current for horizontal scanning. Horizontal output stage 32 also provides high voltage for the cathode ray tube screen and gating pulses for AGC circuit 18. Vertical synchronizing components are coupled to vertical oscillator 36. The synchronized vertical deflection signal is applied to vertical output stage 38 which develops and applies a sawtooth wave current signal to magnetic deflection yoke 40 disposed on the neck of cathode ray tube 24 for vertical scanning.

The video signal on plate 46 of second video amplifier tube 48 (although the drawing shows an electron tube, it may be appreciated that a transistor could be used instead), shown by waveform 42, is applied to the cathodes of picture tube 24 with the smaller amplitudes corresponding to the whiter portions of the picture while the larger amplitudes correspond to the darker portions, black or picture tube cutoff being represented by level 44. Any signal amplitude greater than level 44 is in the blacker than black region and since the blanking pulses occupy this region, the picture tube is driven beyond cutoff during the retrace interval. Often, however, the blanking pulse amplitude is insufficient to keep the retracing beam from appearing on the face of the picture tube when, for example, a maximum brightness, minimum contrast condition is present.

To more effectively remove the retrace lines, horizontal and vertical blanking circuits are employed. Cathode 50 of second video amplifier tube 48 is coupled through resistor 52 and capacitor 54, through the contrast control combination of variable resistor 56 and capacitor 58, and through brightness control resistor 60 to the collector 68 of the switching transistor 62. Variable resistor 72 and capacitor 74 connected from the junction of resistors 52 and 56 to ground provide video peaking. Resistor 76, connected from B+ to base 66, along with a DC return to ground including resistor 78 provides transistor bias. The values of resistors 76 and 78 are selected so that transistor 62 is in saturation during the trace portion, that is, when the picture information is being televised, to thereby place collector 68 effectively at ground potential. In this condition video amplifier tube 48 is operative to amplify video signals applied to its grid so that the peak voltage on plate 46 varies in amplitude dependent on the picture content. During horizontal and vertical retrace of the cathode ray beam, the horizontal deflection system and the vertical deflection system, respectively, develop gating pulses of sufficient magnitude to cut off transistor 62 so that load resistor 70 is effectively placed between collector 68 and ground. The increased resistance in the plate circuit of tube 48 causes a sharp decrease in the plate current so that a blanking pulse having a peak voltage equal to B+ and a duration equal to the gating pulse width is developed on plate 46. The blanking pulse is coupled to the multiple cathodes of cathode ray tube 24 and is of the proper duration to maintain the tube cutoff for a retrace interval. It is to be noted that during the presence of the gating pulse, video amplifier tube 48 is rendered inoperative so as to effectively isolate the rest of the receiver from the cathode ray tube and thereby prevent extraneous signals from appearing on the raster during the retrace intervals. The process of developing the gating pulses on base 66 will now be explained.

Referring to the horizontal deflection system, plate 86 of horizontal oscillator tube 84 is coupled to a wave shaping network comprising diode 88 and capacitor 90. The anode of diode 88 is coupled through the serial combination of capacitor 92, resistor 94 and resistor 78 to ground. This combination causes tube 84 to develop horizontal deflection signal 96 and as shown is comprised of a small positive sawtooth portion and a large negative voltage pulse. Resistors 94 and 78 provide means to control the magnitude of the negative portion of waveform 96. If the circuit of the invention were not present, resistor 94, having a relatively large value, would be connected from capacitor 92 directly to ground. To insert the invention a relatively small value resistor 78 is placed between resistor 94 and ground so that a negligible effect is induced in horizontal oscillator 30 and at the same time a small portion of the horizontal pulse is shunted off to be utilized in the blanking operation. The gating pulse 98 developed across resistor 78 appears when the cathode ray beam is about to commence retrace. Since transistor 62 is shown to be an NPN conductivity type, negative pulse 98 on base 66 serves to cut off transistor 62 which in turn causes a positive blanking pulse to be developed on plate 46 of video amplifier 48 to render cathode ray tube 24 inoperative as explained previously.

Referring now to the vertical deflection system, the cathode 102 of vertical output tube 100 is coupled to base 66 of transistor 62 through capacitor 104, resistor 106 and resistor 80. Resistor 106 and resistor 80 provide isolation between the tube 100, diode 82 and transistor 62. The time durations discussed hereinafter are stated for purposes of illustration. Upon commencement of retrace, a negative pulse 101 from vertical oscillator 36, having a duration equal to the vertical retrace interval or about 700 microseconds, is applied to the grid of vertical output tube 100. The vertical deflection signal voltage waveform 108 developed on cathode 102 is illustrated in enlarged form in FIG. 2A. The voltage begins to drop from its peak at time $t_0$ when retrace commences and reaches zero in approximately 50 microseconds at time 110. The voltage is maintained at zero for the remainder of retrace or about 650 microseconds after which the input pulse 101 is removed so that tube 100 is turned on to begin trace. As shown, the linear voltage increase has a relatively slow "fall time" so that it takes about 16,000 microseconds for the voltage to again reach the peak. Deflection signal 108 may be applied directly to base 66 through a large coupling capacitor, the capacitor providing a zero reference so that a portion of the deflection signal extends negatively and a portion extends positively, the former serving to cut off NPN transistor 62. In such case the degree of saturation of transistor 62 would be selected so that the negative portion would maintain transistor 62 cutoff for a time interval approximately equal to $T_R$.

An improvement in the vertical blanking operation may be obtained by coupling vertical deflection signal 108 through a differentiator network which in its simplest form is a series capacitor and a shunt resistor, the series capacitor being capacitor 104 and the shunt resistor being resistor 106 in series with resistor 80 and the parallel comibnation of resistor 78 and the base-to-emitter resistance of transistor 62 (assuming for the moment that diode 82 is not connected). The gating pulse on base 66 of transistor 62 as affected by the network is illustrated in FIG. 2B. As shown, the reference level for the signal is at zero so that a portion thereof, referred to as the gating pulse, extends in the negative direction. Level 114 represents the voltage at which transistor 62 changes conductive states so that a pulse extending therebelow serves to cut off the transistor. The voltage falls from its peak at time $t_0$ but due to the differentiation, the "rise time" of the leading edge is faster than the rise time of the corresponding edge of vertical deflection signal 108, so that the voltage reaches its negative peak before time 110. Since the rise time is steeper than the signal available from the deflection system, there is a relatively short time lag between the commencement of retrace at $t_0$ and the time the blanking pulse is developed on plate 46 of video amplifier tube 48. The differentiator network changes the slope of vertical deflection signal 108 from a zero value during $T_R$ and a relatively low value thereafter to a much steeper slope, the degree of which is determined by the RC time constant of the network. The series capacitor 104 and the shunt resistance combination are selected so that the trailing edge of the gating pulse has a slope as shown from time 116 to time 118 and crosses transistor cutoff line 114 at time 112 which is the end of retrace. From this time on, the voltage is more positive than the transistor cutoff level 114 and thus transistor 62 remains in saturation throughout time $T_T$ until retrace again commences.

Referring to FIG. 2A, the slope of the vertical deflection signal is relatively flat at time 112 when transistor 62 is to turn on again so that the voltage change from that just prior to time 112 to that slightly thereafter is small. If, however, the differentiator is utilized, the resulting gating pulse in FIG. 2B has a much greater slope at time 112 which results in a greater voltage change so that transistor 62 changes conductive states relatively fast to thereby render video amplifier tube 48 operative immediately upon commencement of trace.

Additional improvement in the combined operation of the horizontal and vertical deflection systems may be had by inserting diode 82 as shown. Horizontal blanking pulses begin to appear before time 112 but those occurring thereafter affect horizontal blanking. Without the diode, the vertical deflection signal, as shown in FIG. 2B, is not flat during time $T_T$. Instead the voltage continues to rise until the base-to-emitter of transistor 62 becomes saturated at about .8 volt. Although the horizontal pulses 120 and 122 are of the same amplitude, their reference changes according to the instantaneous value of the vertical deflection signal. Thus, any pulse during $T_T$ has a different reference value than any other pulse within that interval. If the horizontal pulse had zero rise and fall times, in other words, if the pulse was a perfect square wave, diode 82 would be unnecessary. But since the rise and fall times are finite, pulse 120, occurring just after time 112, presents an interval $T_1$ during which transistor 62 is cut off corresponding to a height $h_1$. As the vertical signal continues to increase, the reference changes so that the next horizontal pulse 122 must heach $h_2$ where its pulse width has decreased so that transistor 62 is cut off only for a time $T_2$. Thus, the horizontal pulses cut off the cathode ray beam for continuously decreasing intervals until the base-to-emitter diode of transistor 62 becomes completely saturated after which the cutoff intervals are relatively constant. When diode 82 is connected as shown, the waveform of FIG. 2C appears on base 66. As soon as the vertical signal attempts to go positive, the diode conducts so as to remove the positive portion and maintain the instantaneous vertical signal voltage constant at the slightly positive diode conduction level 124 from a few microseconds beyond time 112 until the completion of trace. Now the horizontal pulse widths at the transistor cutoff level 114 are the same throughout trace to thereby maintain the cathode ray tube cut off for the same interval during each horizontal return movement.

Since the leading edge of the vertical gating pulse in FIG. 2B has a finite slope, diode 82 and the base-to-emitter diode of transistor 62 provides an advantage in the vertical blanking operation by decreasing the initial voltage at $t_0$ from a relatively large positive peak to the relatively small conduction level 124 of diode 82 shown in FIG. 2C. Since the slopes of the leading edge in FIGS. B and C are the same, the voltage reaches the transistor cutoff level 114 with less delay in the latter so that the blanking pulse on second video amplifier tube 48 is developed that much faster. Thus, with both the diode and the differentiator circuit employed there is less of a time lag between commencement of retrace and the development of a blanking pulse is due to two factors: first, the slope at the leading edge is increased as explained previously with respect to FIG. 2B and secondly, the voltage at $t_0$ is decreased so that less of a voltage change is required to reach cutoff level 114.

What has been described, therefore, is a beam blanking circuit responsive to the vertical and horizontal deflection systems for developing constant duration blanking pulses to cut off the cathode ray tube without appreciable delay from the instant the beam begins its return movement and to maintain the cathode ray tube cutoff until the completion thereof.

Although this invention has been described for one particular embodiment, it may be changed in ways obvious to those skilled in the art and still be within the spirit and scope of the following claims.

I claim:

1. In a television receiver comprising a cathode ray tube, a deflection system for sweeping a cathode ray beam having trace and retrace intervals, a source of video signals, and a beam blanking circuit including the combination of: a video amplifier coupling the source of video signals to the cathode ray tube, switching means coupled to said video amplifier and adapted to be switched between different conductive states, said deflection system furnishing a deflection signal, a network coupling said deflection system to said switching means and responsive to said deflection signal to provide gating pulses, a gating pulse greater in amplitude than a predetermined level driving said switching means into one of said conductive states, said gating pulse being greater than said predetermined level for a retrace interval, said video amplifier being responsive to said one conductive state to develop a blanking pulse poled to cutoff said cathode ray tube for said retrace interval.

2. The beam blanking circuit according to claim 1, said network comprising a differentiator circuit including series capacitance means in the signal path between said deflection circuit and said switching means, and shunt resistance means connected from said capacitance means to a point of reference potential; said switching means having input resistance means; said differentiator circuit, and said input resistance means having an RC time constant short with respect to the period of said deflection signal to thereby cause said gating pulse to have rise and fall times relatively fast with respect to the rise and fall times of said deflection signal.

3. The beam blanking circuit according to claim 1, said deflection system comprising a source of vertical deflection signals, said network responsive to said vertical deflection signal to provide vertical gating pulses, said network comprising means for developing a constant reference voltage between said vertical gating pulses, a source of horizontal gating pulses coupled to said switching means, the reference of said horizontal gating pulses being said constant reference voltage so that said horizontal gating pulses are greater in amplitude than said predetermined level for a constant duration.

4. The beam blanking circuit according to claim 1, said deflection system comprising a source of vertical deflection signals; said network comprising a differentiator circuit including series capacitance means in the signal path between said deflection system and said switching means, shunt resistance means connected from said capacitance means to a point of reference potential, and a diode connected in parallel with said resistance means; said switching means having input resistance means; said series capacitance means, said shunt resistance means, said diode and said input resistance means having an RC time constant short with respect to the period of said vertical deflection signals to thereby develop vertical gating pulses having rise and fall times relatively fast with respect to the rise and fall times of said vertical deflection signal; said diode being responsive to said vertical deflection signals for developing a constant reference voltage between said vertical gating pulses equal to the conduction level of said diode; a source of horizontal gating pulses coupled to said switching means; the reference of said horizontal gating pulses being said constant reference voltage so that said horizontal gating pulses are greater in amplitude than said predetermined level for a constant duration.

5. The beam blanking circuit according to claim 1, the output portion of said switching means comprising a transistor having a control electrode and an output electrode, said network coupled to said control electrode, said output electrode coupled to said video amplifier, said one conductive state being cut off, means for biasing said transistor into conduction during the absence of said gating pulses, each of said gating pulses having a duration sufficient to cut off said transistor during said retrace interval.

6. The beam blanking circuit according to claim 1, said video amplifier comprising an electron discharge device having a plate and a cathode, said cathode ray tube having an electrode to which video signals are applied, said switching means comprising a transistor having a control electrode and an output electrode, said one conductive state being cut off, said network coupled to said control electrode and said output electrode coupled to said cathode, means for biasing said transistor into conduction during the absense of said gating pulses, each of said gating pulses having a polarity to cut off said transistor and thereby cause said video amplifier to develop a positive polarity blanking pulse on said plate, means coupling said plate to said electrode for conducting said blanking pulse thereto for cutting off said cathode ray tube during said retrace interval.

7. The television receiver according to claim 1 said deflection system consisting of a horizontal deflection system and a vertical deflection system, said network comprising means coupling said horizontal deffection system to said switching means to provide horizontal gating pulses, and means coupling said vertical deflection system to said switching means to provide vertical gating pulses.

8. In a television receiver comprising a cathode ray tube, a deflection system providing deflection signals for sweeping a cathode ray beam having trace and retrace intervals, a source of video signals, and a video amplifier, a beam blanking circuit including in combination:

a normally conductive transistor switch connected in the conductive path of the video amplifier and adapted to be switched into a non-conductive state; and means for coupling deflection signals from the deflection system to the transistor switch to render the transistor switch non-conductive in response to the retrace interval of the deflection signals, the video amplifier being responsive to non-conduction of the transistor switch to develop a blanking pulse poled to cut off the cathode ray tube.

9. A television receiver according to claim 8 wherein the deflection system consists of a horizontal deflection system and a vertical deflection system, with said coupling means coupling signals obtained from both the horizontal and the vertical deflection systems to the transistor switch to render the transistor switch non-conductive in response to the signals obtained during the retrace intervals from both the vertical and horizontal deflection systems.

10. A television receiver according to claim 8 further including means for establishing a reference voltage connected to the transistor switch so that the tarnsistor switch is rendered non-conductive only in response to deflection signals in the retrace interval which exceed said reference voltage.

References Cited

UNITED STATES PATENTS 2,950,346 8/1960 Freedman et al. ------ 175—7.5

ROBERT L. GRIFFIN, *Primary Exeminer.*

ROBERT L. RICHARDSON, *Assistant Examiner.*

U.S. Cl. X.R.

315—22, 30

Notice of Adverse Decision in Interference

In Interference No. 97,465 involving Patent No. 3,446,915, R. C. Voige, CATHODE RAY TUBE BEAM BLANKING CIRCUIT, final judgment adverse to the patentee was rendered Nov. 16, 1972, as to claims 1 and 5.

[*Official Gazette February 6, 1973.*]